(12) United States Patent
Nouri

(10) Patent No.: US 6,484,213 B1
(45) Date of Patent: Nov. 19, 2002

(54) ADAPTING NETWORKING DEVICE FOR ENHANCING PERFORMANCE OF A HYBRID NETWORKING SYSTEM

(75) Inventor: Ahmad Nouri, Denton County, TX (US)

(73) Assignee: Compaq Information Technologies Group, Inc., Houston, TX (US)

(*) Notice: Subject to any disclaimer, the term of this patent is extended or adjusted under 35 U.S.C. 154(b) by 0 days.

(21) Appl. No.: 09/150,105

(22) Filed: Sep. 9, 1998

(51) Int. Cl.[7] .............................................. G06F 13/00
(52) U.S. Cl. ...................................................... 709/249
(58) Field of Search ................................ 709/249, 220; 714/39, 43; 370/401, 465

(56) References Cited

U.S. PATENT DOCUMENTS

| | | | | |
|---|---|---|---|---|
| 5,490,252 A | * | 2/1996 | Macera et al. ............... | 709/249 |
| 5,497,460 A | * | 3/1996 | Bailey et al. ................. | 714/39 |
| 5,617,418 A | * | 4/1997 | Shirani et al. ............... | 370/465 |
| 5,742,602 A | * | 4/1998 | Bennett ........................ | 370/401 |
| 5,841,990 A | * | 11/1998 | Picazo, Jr. et al. ........... | 709/249 |
| 5,953,340 A | * | 9/1999 | Scott et al. ................... | 370/401 |

* cited by examiner

Primary Examiner—David Wiley
(74) Attorney, Agent, or Firm—Akin, Gump, Strauss, Hauer & Feld, LLP

(57) ABSTRACT

An adaptive networking device including a plurality of network ports operable at any one of a plurality of media standards, a bus and a first device coupled to the bus that communicatively couples to any of the network ports that operate at a first media standard in order to transfer data between the bus and network ports communicatively coupled to the first device. The adaptive networking device further includes a second device operable at a second media standard and including a link port, where the second device communicatively couples to any of the network ports that operate at the second media standard to transfer data between the link port and those network ports communicatively coupled to the second device. The adaptive networking device further includes a bridge that transfers data between the link port and the bus to enable communication between the first and second devices. The first device preferably establishes a switched domain and the second device preferably established a shared domain. The bridge preferably operates to enable communication between the switched and shared domains.

21 Claims, 3 Drawing Sheets

ADAPTING NETWORKING DEVICE FOR ENHANCING PERFORMANCE OF A HYBRID NETWORKING SYSTEM

FIELD OF THE INVENTION

The present invention relates to the field of networking data devices, and more particularly to an adaptive networking device for enhancing performance of a hybrid networking system.

DESCRIPTION OF THE RELATED ART

Ethernet is a shared-media network architecture defined in the Institute of Electrical and Electronics Engineers (IEEE) 802.3 standard, and is currently the most widely used architecture for local-area networks (LANs). Ethernet uses both bus and star topologies having nodes attached to a trunk segment, which is the main piece of cable in an Ethernet network. The 10Base-T is a communication protocol based on the IEEE 802.3 standard, which is a baseband 802.3-based Ethernet network that operates up to 10 Mbps (megabits per second), and uses unshielded twisted-pair (UTP) cable configured in a star topology. The 10Base-T protocol is also known as twisted-pair Ethernet or UTP Ethernet.

Another Ethernet standard has emerged, referred to as fast Ethernet or 100Base-T Ethernet, which includes implementations capable of 100 Mbps transmissions speeds over UTP or shielded twisted-pair (STP) and is defined in IEEE 802.3u. 100Base-T covers several physical media types, including 100Base-T4 and 100Base-TX using twisted-pair wires. Twisted-pair Ethernet networks typically use RJ-45 modular connectors or variations thereof. Other mediums are known, such as 10Base-F for fiber-optic cable, including fiber passive (FP), fiber link (FL) and fiber backbone (FB). Networks using fiber optic media operate in a similar manner as twisted-pair, but include appropriate fiber-optic cabling, connectors, and physical media interface devices.

Each node in the network is typically a computer of some type, such as a personal computer (PC), minicomputer, mainframe, or the like, where the computer generally includes a network interface card (NIC) for interfacing the computer to a network device, such as a hub, concentrator, repeater, router, bridge, switch, etc., to enable networking capabilities. In the present disclosure, each node or segment is associated with a network device or data terminal equipment (DTE), where each generally refers to any source or destination of data connected to any network system, such as a LAN or the like.

A network operating according to a given communications protocol may be expanded by using one or more repeaters. A repeater is a hardware device that functions at the physical layer of the Open Systems Interconnection (OSI) Reference Model and includes several ports to connect two or more segments of the same network. In particular, a repeater receives packets or data from a node coupled to one port and re-transmits the packets or data to nodes attached to the other ports of the repeater. For example, a 10 Mbps repeater in a star configuration with six ports receives a data packet on one of its ports and repeats or re-transmits the message to the remaining five ports. One particular disadvantage of repeaters is a significant amount of extraneous data traffic, since data is repeated to all nodes even though usually intended for only one or a subset of the nodes.

A bridge is a hardware device which passes packets from one network to another. Bridges operate at the data-link layer of OSI Reference Model and makes several networks appear as a single network to higher level protocols or programs. A bridge serves both as a medium and as a filter, and it allows packets from a node on one network to be sent to a node on another network. At the same time, the bridge discards any packets intended for the originating network rather than passing these to the other network. A switch is a device that connects information coming in with an appropriate outlet. For example, the input may be packets and the outlet might be an Ethernet bus, such as in an Ethernet switch. A switch is similar in function to a multi-port bridge.

The advent of the 100 Mbps standard and a corresponding transition in the industry towards higher transmission rates often results in hybrid systems that service both 10 Mbps and 100 Mbps data devices. One particular product is the 28115 10/100 Ethernet Switch by Bay Networks. The 28115 switch has 16 ports, each capable of operating at 10 Mbps or 100 Mbps switched. This particular product is relatively expensive since each port is capable of operating at 100 Mbps, where the port is simply throttled back when coupled to a 10 Mbps device. A device which is capable of switch functions at 100 Mbps is very expensive. Also, if several slower speed devices are connected to a single high speed device, such as a server, much of the high speed switch capability is wasted, resulting in an inefficient design.

As networks have evolved with a mix of data devices operating at different communication rates, hardware typically has to be modified and upgraded. It is desired to provide hybrid operation and to enable modifications or upgrades in a cost effective manner.

SUMMARY OF THE INVENTION

An adaptive networking device according to the present invention includes a plurality of network ports operable at any one of a plurality of media standards, a bus, and a first device coupled to the bus that communicatively couples to any of the network ports that operate at a first media standard in order to transfer data between the bus and network ports communicatively coupled to the first device. The adaptive networking device further includes a second device operable at a second media standard and including a link port, where the second device communicatively couples to any of the network ports that operate at the second media standard to transfer data between the link port and those network ports communicatively coupled to the second device. The adaptive networking device further includes a bridge that transfers data between the link port and the bus to enable communication between the first and second devices.

In an embodiment described herein, the first device operates as a network switch, the second device operates as a network repeater and the bridge operates as a switch for filtering communication between the link port and the bus. Each of the network ports includes media circuitry that detects a node coupled to a corresponding port and determines the media standard of the node. The media circuitry communicatively couples the corresponding network port to one of the first and second devices based on the determined media standard. In this manner, a network node that operates at the first media standard and that is coupled to the adaptive networking device via a network port is placed into a switched domain whereas a network node that operates at the second media standard is placed into a shared domain. The bridge enables communication between the switched and shared domains without substantially affecting the performance of either domain. In an embodiment described herein, the first media standard is 10BaseT Ethernet™ operating at 10 megabits per second (Mbps) and the second media standard is 100BaseTX operating at 100 Mbps. The bus is implemented according to the Peripheral Component Interconnect (PCI) standard and operates at a data transmission rate of approximately one gigabit per second (Gbps). The bridge preferably includes a second link port that operates as an uplink port for the adaptive networking device. The uplink port enables expansion of either one of the switched and shared domains. A management device may be coupled to the bus and the second device to provide management functionality. A memory device may also be provided and coupled to the management device.

The present invention contemplates the use of network components commercially available. In an alternative embodiment, the first device may instead be a plurality of switch modules coupled to the bus, where each couples to a respective subset of the network ports. Also, the second device may instead be first and second repeater modules, each coupled to respective first and second sets of the network ports. For example, the adaptive networking device may include 24 ports, where three switch modules handle eight ports each and two repeater modules handle 12 ports each. The switch modules each include bus interfaces for communicatively coupling to the bus. The bridge includes a bus interface for communicatively coupling to the bus and a MAC port for communicatively coupling to a corresponding MAC port of one of the repeater modules.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
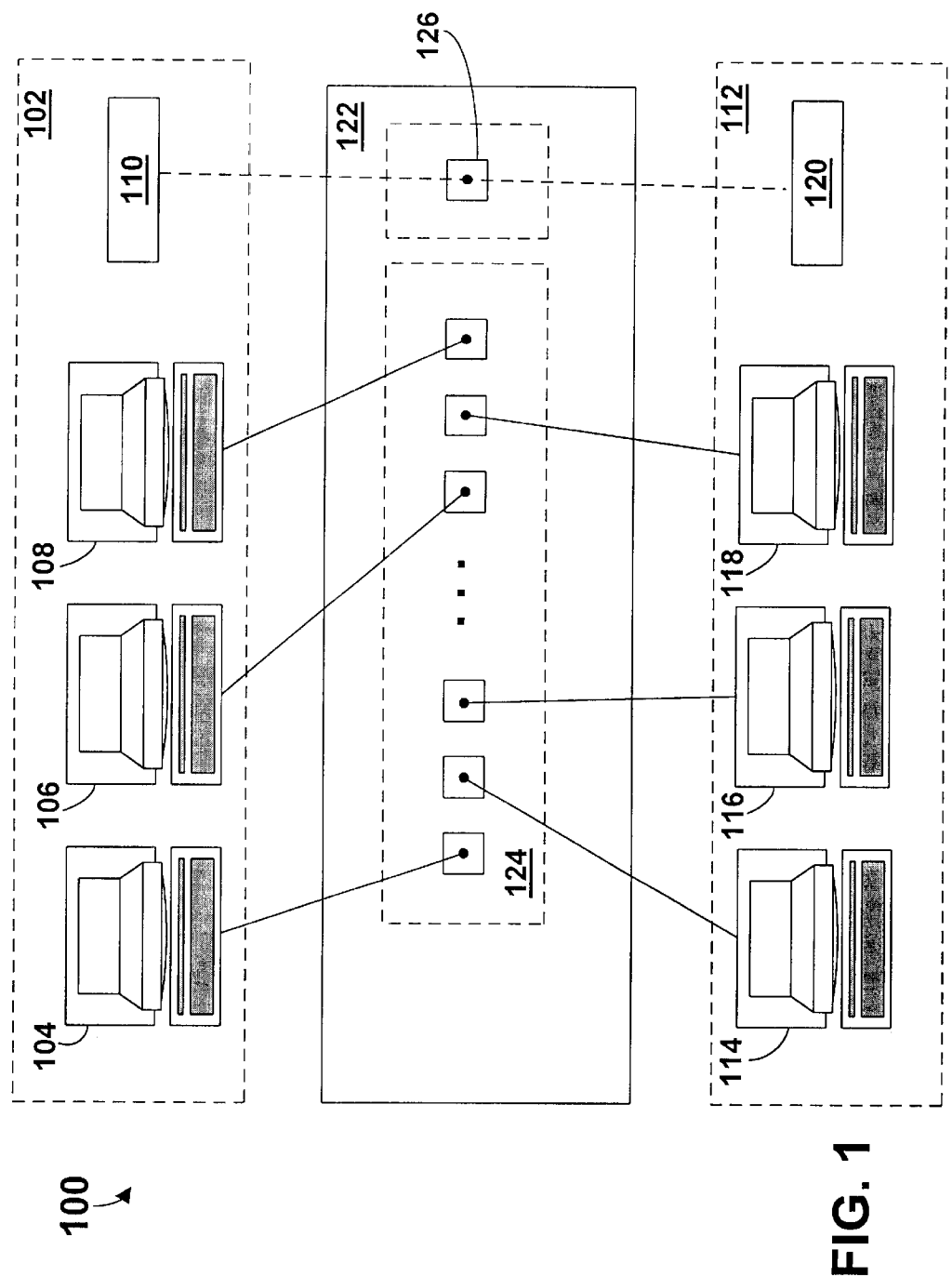
FIG. 1 is a block diagram of a network including an adaptive networking device implemented according to the present invention for interconnecting and establishing communication between a plurality of data devices or nodes.

FIG. 1 is a block diagram of a network 100 including an adaptive networking device 122 implemented according to the present invention for interconnecting and establishing communication between a plurality of data devices or nodes. The adaptive networking device 122 services a first plurality of network nodes in a first domain 102 operating according to a first media standard and a second plurality of network nodes in a second domain 112 operating according to a second media standard. As shown in FIG. 1, the first domain 102 includes network nodes 104, 106, and 108 and the second domain 112 includes network nodes 114, 116, and 118. The nodes 104, 106, and 108 transmit and receive data according to the first media standard and the nodes 114, 116, and 118 transmit and receive data according to the second media standard. Each of the nodes 104, 106, 108, 114, 116, and 118 are any source or destination of data, such as any type of data terminal equipment (DTE) that allows either input or output of data, or comprises any type of network device for connecting together one or more DTEs. For example, node 104 may comprise a computer, work station, file server, modem, printer, or any other device that can receive or transmit data in the network 100, such as a repeater, switch, router, hub, concentrator, etc.

Each of the nodes of either domain, including the nodes 104, 106, 108, 114, 116, 118, is coupled to any one of a plurality of network ports 124 of the adaptive networking device 122. Each port 124 supports the first and second media standards, and operates at one of the supported media standards depending upon the coupled node. Also, an optional uplink port 126 is also provided for coupling to either one of two expansion devices 110 and 120, where the uplink port 126 supports both of the first and second media standards depending upon the media standard of the coupled expansion device. The optional expansion devices 110 and 120 increase the number of nodes serviced in first domain 102 and the second domain 112, respectively. For example, the first expansion device 110 operates at a first media standard and allows additional nodes to be added to the first domain 102. The second expansion device 120 operates at second media standard and allows additional nodes to be added to the second domain 112.

When a node or device is coupled to any of the ports 124 or the uplink port 126, the node sends link signals which are detected by media circuitry associated with each port. In the embodiment shown, each of the ports 124, 126 detects the link signals and automatically negotiates the highest common capability between the node and the adaptive networking device 122. Auto-negotiation results in operation at the highest common allowable rate. When a link has been established, a node is coupled with the domain that is appropriate for its determined media standard and communication proceeds according to the determined media standard. If a device modifies its media standard or if a different node operable at a different media standard is coupled to the same port, the adaptive networking device 122 automatically places the node in the proper domain. For example, if the node 104 operating at the first media standard is modified or otherwise removed and replaced with a different node 104' operable at the second media standard, the media circuitry of associated port 124 automatically detects the new media standard and places the node 104' into the second domain 112.

Also, the uplink port 126 services either of the expansion devices 110 and 120. When the expansion device 110 is coupled to the uplink port 126, it operates according to the first media standard and when the expansion device 112 is coupled to the uplink port 126, it operates according to the second media standard. In this manner, a network that includes nodes operating according to two or more different media standards is easily managed and upgraded using the adaptive networking device 122.

The adaptive networking device 122 enables communication between any nodes in the first domain 102 including the nodes 104, 106 and 108. The adaptive networking device 122 also enables communication between any nodes in the second domain 112 including the nodes 114, 116 and 118. The first and second domains 102 and 112 may each operate according to either shared or switched mode. In shared mode, data received by the adaptive networking device 122 at one port is repeated to all other ports and thus the other nodes associated with the same shared domain. For example, if the second domain 112 is a shared domain, then a packet of data sent from the node 114 is repeated and transmitted by the adaptive networking device 122 to the other nodes in the second domain 112, including the nodes 116 and 118. In switched mode, data received by the adaptive networking device 122 at one port 124 is examined to determine the appropriate destination port, and the data is sent to the determined destination port. If the destination is not known or has not been "learned", then the packet is repeated to all other ports in the same domain. In the present invention, a particular mode of operation is not required for either domain. Either domain could operate in either shared or switched mode.

In one embodiment, data is sent in packet form where each packet includes a source and a destination identifier. For example, Ethernet™ packets include source and destination MAC addresses. The adaptive networking device 122 stores each source address and an associated port number in a database. The adaptive networking device 122 compares the destination address with addresses in the database to determine the port associated with the destination address, and sends the packet via the associated port. If the address is not found, the packet may be broadcast to ports in the same domain other than the source port. The destination address may also identify a broadcast packet for transmission to all other ports or a multicast packet for transmission to selected ports.

In the preferred embodiment, the first and second domains 102, 112 are communicatively coupled within the adaptive networking device 122 via an internal bridge, described further below. The bridge may operate in any one of several manners as desired, but generally operates to filter and transfer data or packets between the domains 102, 112. The bridge effectively prevents the flow of extraneous traffic between the domains 102 and 112. As described further below, the bridge enables communication between the domains without transmitting extraneous traffic which would otherwise substantially reduce the efficiency of either domain. In this manner, any of the nodes in the first domain 102, such as the nodes 104, 106 and 108, may send data packets to nodes in the second domain 112, such as the nodes 114, 116 and 118, and vice versa.

In a more specific embodiment, the network 100 operates as an Ethernet™ local area network (LAN) as specified in IEEE (Institute of Electronic and Electrical Engineers) 802.3 and as a fast Ethernet LAN as specified in IEEE 802.3u. For example, the first media standard of the first domain 102 operates according to the Ethernet™ 10BaseT standard with a transmission rate of 10 Mbps and the second media standard of the second domain 112 operates according to the Ethernet™ 100BaseTX standard with a transmission rate of 100 Mbps. Nodes and devices are coupled to adaptive networking device 122 using unshielded twisted pair (UTP), shielded twisted pair (STP), fiber-optic lines, wireless links, such as infrared or radio frequency links, or any other communication link that allows communication of data between nodes and adaptive networking device 122. Although the present invention is illustrated using Ethernet™, other communication and network media standards and protocols are contemplated. For the Ethernet™ embodiment, each of the ports 124, 126 operate according to either 10BaseT or 100BaseTX Ethernet™ and are frequency agile. A device or node operating at 10 Mbps is placed into the first domain 102 and a device or node operating at 100 Mbps is placed into the second domain 112.

In the embodiment shown, the first domain 102 operates in switched mode at a transmission rate of 10 Mbps and the second domain 112 operates in shared mode at a transmission rate of 100 Mbps. It is understood, however, that the particular media standards and transmission rates are exemplary and used herein for illustration. Other media standards and/or transmission rates are contemplated. For example, a one gigabit per second (Gbps) transmission rate is contemplated for alternative embodiments and could employ the same or similar media standards. The bridge learns the addresses of devices or nodes in either the first domain 102 or the second domain 112, or both, and operates to enable communication between the first and second domains 102, 112 without significant extraneous traffic therebetween. For the 10 and 100 Mbps Ethernet™ embodiment, the bridge includes the necessary memory and logic to convert data between the 10BaseT and 100BaseTX media standards.

Figure 2:
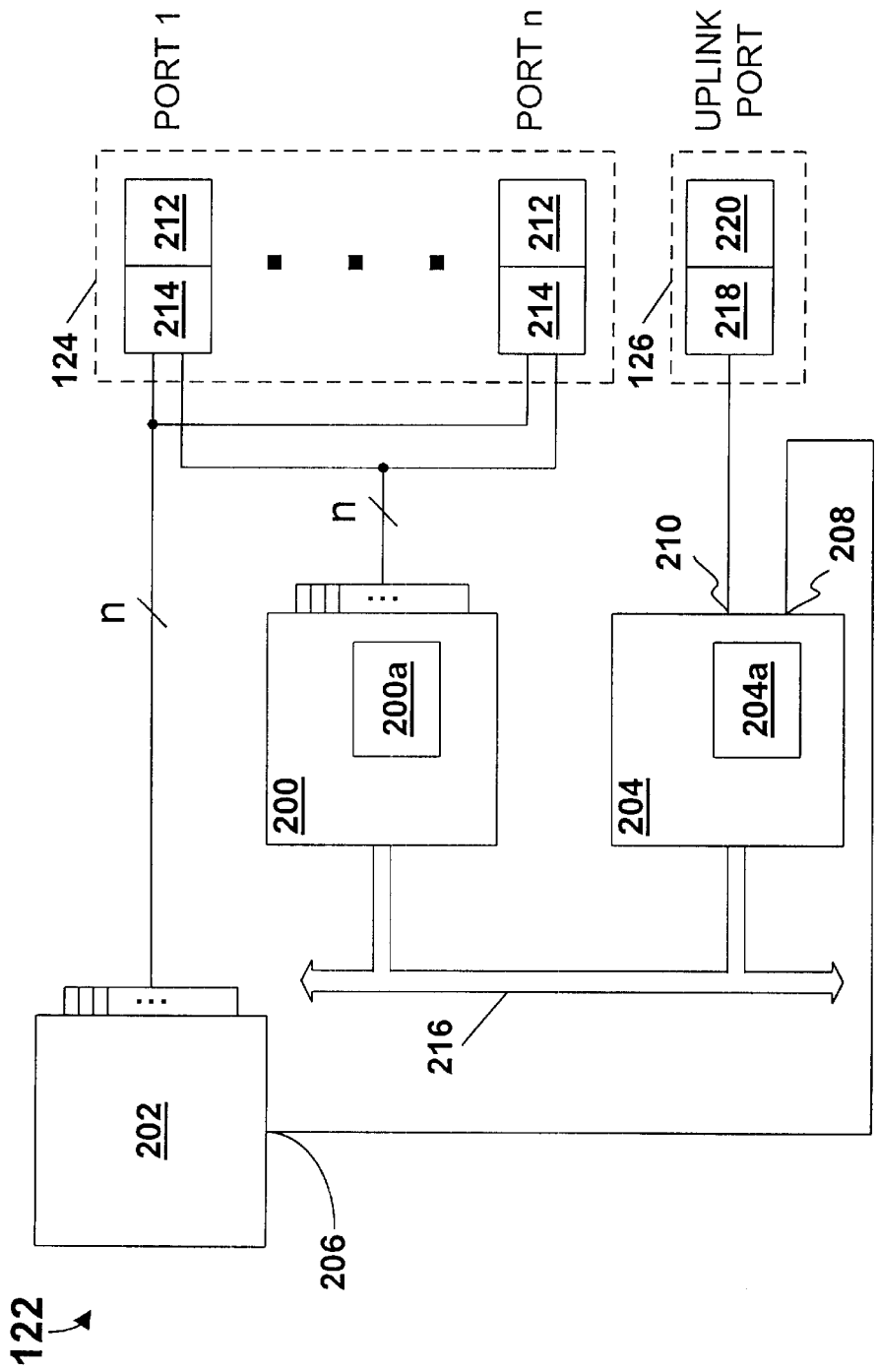
FIG. 2 is a schematic representation of one embodiment of the adaptive networking device of FIG. 1.

Referring now to FIG. 2, a schematic block diagram is shown of one embodiment of the adaptive networking device 122. The adaptive networking device 122 includes any desired number (n) of ports 124. Each of the ports 124 includes an appropriate port connector 212, such as an RJ-45 jack or the like, depending upon the media standard(s) supported. Each of the ports 124 further includes media circuitry 214 coupled to the respective port connector 212. The particular implementation of the media circuitry 214 depends upon the media standard(s) supported by the adaptive networking device 122. For Ethernet™, for example, the media circuitry 214 includes appropriate magnetic components and a physical layer circuit or PHY device. The adaptive networking device 122 further includes a first network device 200 and a second network device 202, each having "n" separate port interfaces coupled to the respective media circuitry 214 of the respective ports 124. The first network device 200 operates according to the first media standard associated with the first domain 102 and the second network device 202 operates according to the second media standard associated with the second domain 112. In this manner, the first network device 200 establishes or controls the first domain 102 and the second network device 202 establishes or controls the second domain 112.

In operation, the media circuitry 214 determines the media standard being used by the associated node and communicatively couples the node or device to the network device 200 or to the network device 202 as appropriate. The media circuitry 214 of each port includes communication link logic that detects the media standard of a coupled network node or device and communicatively couples that node to either the first network device 200 or the second network device 202. The media circuitry 214 in one embodiment includes an Ethernet™ transceiver or other physical layer component that operates, for example, at both 10 Mbps and 100 Mbps, depending on the data rate of the node communicating therewith. Examples of such commercially available devices include the RCC611 100BaseTX transceiver manufactured by Raytheon or the DP83840 10/100 Mbps physical layer device manufactured by National Semiconductor. The communication link logic of the media circuitry 214, for example, may perform auto-negotiation using N-way auto-negotiation developed by International Business Machines Corp. to detect the media standard.

The network device 200 further includes a bus interface for communicating with a bus 216. A bridge device 204, implemented as a bridge or switch device, includes a link port or network port interface 208 that is coupled to a similar link port or network port 206 of the second network device 202. The network device 204 includes a bus interface for communicating with the bus 216. The network device 204 optionally includes a second port interface 210 coupled to respective media circuitry 218 of the uplink port 126 of the adaptive networking device 122. The media circuitry 218 is coupled to an appropriate port connector 220 of the uplink port 126. The media circuitry 218 may operate as a PHY device compatible with the network device 204 for enabling communication with a compatible network device coupled to the uplink port 126. Alternatively, the network device 204 operates according to several supported media standards, and the media circuitry 218 is similar to the media circuitry 214 and includes communication link logic such as auto-negotiation logic or the like that determines the highest common capability between the network device 204 and the coupled device.

The network devices 200 and 202 operate according to either shared or switched mode. In either case, the bridge device 204 operates to enable communication between the first and second domains 102, 112 via the bus 216. The bus 216 is preferably a parallel bus with a plurality of address and data signal lines for transferring data at a relatively high transmission rate. The bus 216 is preferably a parallel bus, such as according to the Peripheral Component Interconnect (PCI) standard or the like, and operates at a relatively high transmission rate, such as 1 Gbps. The bridge device 204 operates as a filter and determines whether to transfer communication between the bus 216 and the network device 202. For packet-type communication including source and destination identifiers, the bridge device 204 learns the identifiers associated with either the first domain 102, or the second domain 112 or both. For this purpose, the bridge device 204 preferably includes a memory 204a to learn identifiers or addresses associated with each of the nodes of either or both of the domains 102, 112.

In one embodiment, for example, the network devices 200 and 202 both operate in shared mode. Thus, data communication received by the network device 202 other than via the network interface 206 is repeated to the bridge device 204. Likewise, data communication received by the network device 200 other than via the bus 216 is repeated onto the bus 216 and provided to the bridge device 204. If the bridge device 204 learns identifiers of the first domain 102 only, then communication from the bus 216 with a known identifier is dropped and communication from the bus 216 with an unknown identifier is repeated to the network device 202. Communication from the network device 202 with known identifiers are transferred to the bus 216 and communication with unknown identifiers are not transferred to the bus 216. Alternatively, the bridge device 204 only learns identifiers from the second domain 112. Communication from the second domain 112 with known identifiers is dropped by the bridge device 204 and communication with unknown identifiers is transferred to the bus 216. In yet another alternative embodiment, the bridge device 204 learns identifiers of both domains and only transfers communication from one domain to the other if the identifier is known.

In another embodiment, the network device 200 operates in switched mode and learns identifiers of devices or nodes in the first domain 102 coupled via the ports 124. For this purpose, the network device 200 includes a memory 200a for storing identifiers or addresses. The network device 200 examines the source and destination identifiers of communications received and re-transmits the communication according to switched mode of operation. Communication with unknown identifiers are placed on the bus 216 and received by the bridge device 204. The bridge device 204 determines whether to transfer the packet to the network device 202 based upon its database of learned identifiers or addresses in a similar manner as described above. The network device 202 operates in shared mode and repeats communication received to every other port 124 associated with the second domain 112 and to the bridge device 204. The bridge device 204 determines whether to transfer the packet to the bus 216 and thus to the network device 200 based upon its database of learned identifiers or addresses in a similar manner as described above. In any event, the bus 216 operates as a high speed link between the first and second domains 102, 112, and the network device 204 operates as a filter between the two domains.

In a more specific embodiment, the network device 200 includes an 8 port, GT48001A Switched Ethernet™ Controller for 10BaseX manufactured by Galileo Technology®. The GT-48001A includes an DRAM interface for coupling to an external memory device implementing the memory 200a. The network device 200 learns the addresses of the first domain 102, and transfers packets with known addresses from the bus 216 to the proper destination port. The network device 200 repeats each packet with an unknown address from a port to its remaining operating ports and to the bus 216. An example of a switched device that is commercially available for use as the bridge device 204 is the 2-port GT-48002A Switched Fast Ethernet™ Controller for 100BaseX manufactured by Galileo Technology®. The GT-48002A also includes a DRAM interface for interfacing an external memory device implementing the memory 204a. The bridge device 204 learns the addresses of the first domain 102 associated with the network device 200 and transfers packets from the bus 216 to the network device 202 only if the destination address of the packet is unknown. Both the GT-48001A and GT-48002A devices include a PCI bus controller and configuration registers for interfacing the bus 216, which is a PCI bus in this embodiment.

An example of a multiple port repeater device for implementing the network device 202 is the 1224 Micro 10/100 Repeater by Compaq Computer Corporation or the BCM5012 by Broadcom Corporation. The network device 202 repeats each packet received from each port, including the port interface 206, to every other operating port. Thus, packets received by the network device 202 from nodes in the second domain 112 are repeated to the bridge device 204. The bridge device transfers the packet to the bus 216 only if the destination address is known since in this embodiment the bridge device 204 learns the addresses of the first domain 102. It is noted that the GT-48002A operates according to Ethernet™ at either 10 or 100 Mbps for either of its port interfaces 208, 210. If the uplink port 126 is coupled to the expansion device 110, then the bridge device 204 operates the uplink port 126 in switch mode in a similar manner as the network device 200 and learns addresses received at the uplink port 126. If the uplink port 126 is coupled to the expansion device 120, then the bridge device 204 operates the uplink port 126 in shared mode in a similar manner as the network device 202.

The embodiment depicted in FIG. 2 can be modified for handling any practicable number of ports as desired. For example, the network devices 200, 202 of FIG. 2 may each comprise multiple modules, each handling a subset of the ports 124. The embodiment depicted in FIG. 2 may also be modified to permit accommodation of nodes operating at any of three or more different rates or protocols. Additional devices, similar to the network devices 200, 202, may be included as desired. For example, an additional device may be provided that handles communications at 1 Gbps, where the network device 200 handles communications at 10 Mbps and the network device 202 handles communications at 100 Mbps.

Figure 3:
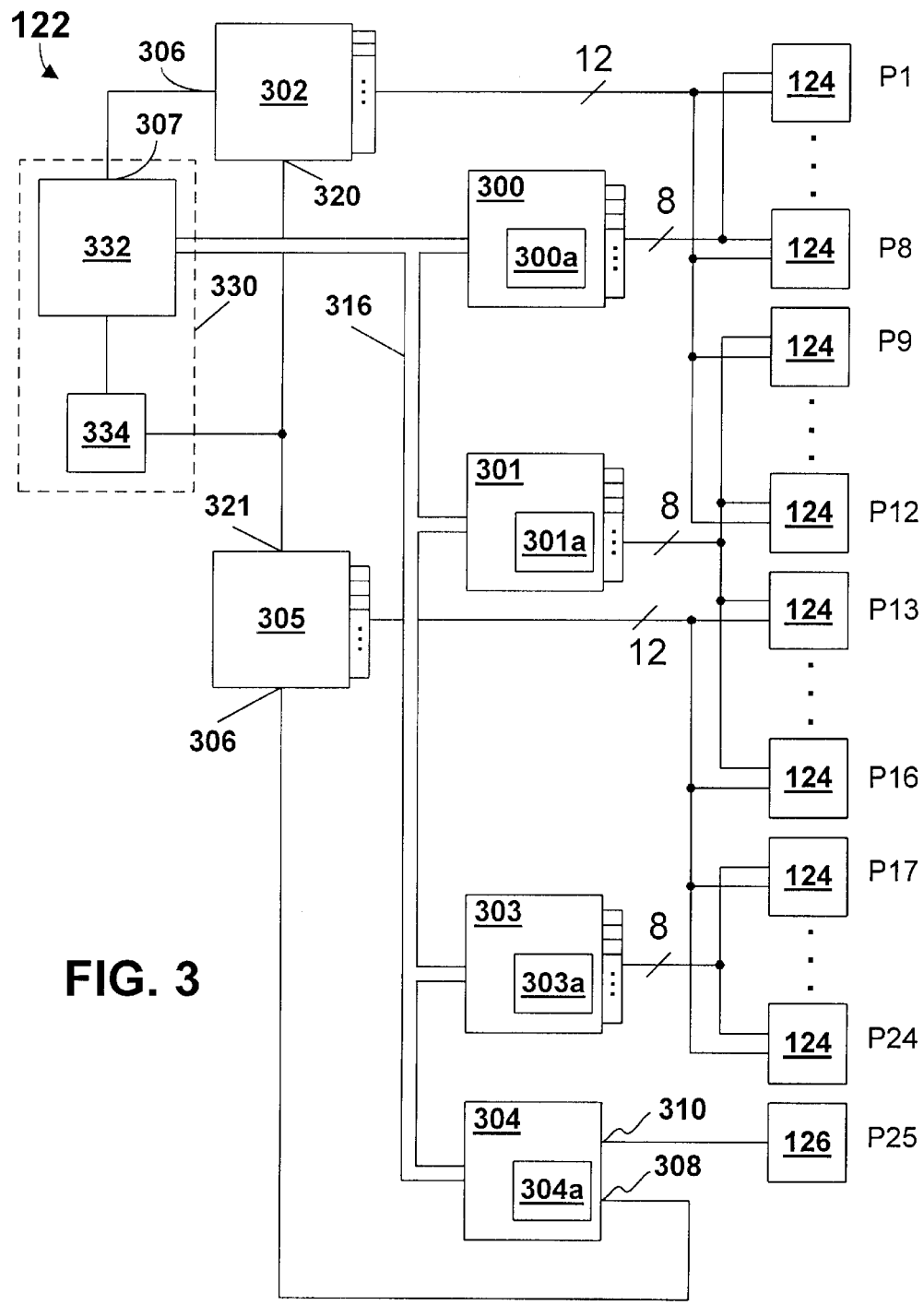
FIG. 3 is a schematic representation of another embodiment of the adaptive networking device of FIG. 1.

FIG. 3 illustrates a more specific embodiment of the adaptive networking device 122 having 24 ports 124 and one uplink port 126. Three network devices 300, 301 and 303 are provided, each similar to the network device 200 and coupled to a bus 316, which is similar to the bus 216. Again, the bus 316 may comprise a PCI bus or the like operating at 1 Gbps. Each network device 300, 301 and 303 is coupled to eight of the 24 ports, where the first network device 300 handles ports PORT 1–8, the second network device 301 handles ports PORT 9–16, and the third network device 303 handles ports PORT 17–24. The network devices 300, 301 and 303 include optional memory devices 300a, 301a and 303a, respectively, if operating in switched mode in a similar manner as described previously. A bridge device 304, similar to the network device 204, includes a bus interface coupled to the bus 316, a first port interface 310 coupled to the uplink port 126 and a second link port or port interface 308 coupled to a link port or port interface 306 of a network device 305, which is similar to the network device 202. The bridge device 304 also includes a memory device 304a. A first network device 302, similar to the network device 202, is coupled to the first twelve ports PORT 1–12 and the second network device 305 is coupled to the second twelve ports PORT 13–24 and includes the port interface 306 coupled to the port interface 308 of the bridge device 304. The network device 302 includes an additional port interface 320 coupled to an additional port interface 321 of the network device 305.

Each of the network devices 300, 301 and 303 may be implemented using the GT-48001A devices or the like and each of the network devices 302, 305 may be implemented using the 1224 Micro 10/100 Repeater or the like. The bridge device 304 may be implemented using the GT-48002A device. The network devices 300, 301 and 303 each include eight Tx/Rx Interfaces for coupling to corresponding TX/Rx Interfaces of each of the ports 124. The bridge device 304 includes two Media Independent Interface (MII) ports for implementing the port interfaces 308, 310, where the uplink port 126 includes a compatible MII for interfacing the port interface 310. Each of the network devices 302, 305 includes twelve MII ports, each for interfacing an MII port of each of its twelve ports 124. The network device 305 includes an additional MII or MAC port that is coupled to the second MII port of the bridge device 304. Each of the network devices 302 and 305 includes an Attachment Unit Interface (AUI) port, which are coupled to each other to enable communication between the network devices 302, 305 implementing the second domain 112.

In the embodiment shown, each of the network devices 300, 301 and 303 each operate in switch mode and communicate packets between each other via the bus 316 to implement the first domain 102. Each of the network devices 300, 301 and 303 learn every address of the first domain 102. If a packet is received by one of the network devices 300, 301 or 303 and intended for a port coupled via either one of the other network devices of the first domain 102, then the receiving network device transfers the packet to the bus 316. For example, if the network device 300 receives a packet from a port PORT1–8 that is intended for another port coupled via the network device 303, then the network device 300 transfers the packet to the bus 316. The network device 303 detects that the packet is intended for one of its ports and retrieves the packet. The packet is then transmitted via one of the ports PORT 17–24. Packets with unknown addresses are transferred to the bus 216 for handling by the bridge device 304.

The network devices 302 and 305 operate in shared mode and communicate packets via the port interfaces 320, 321. Packets received at any of the ports PORT 1–12 received by the network device 302 are repeated to the network device 305, which repeats the packets to any of its coupled ports PORT13–24, and vice versa. Also, packets from the second domain 112 are repeated to the bridge device 304 via the port interfaces 306, 308. If the bridge device 304 only learns addresses of packets from the first domain 102, then packets from the second domain via the network device 305 with destination addresses associated with the first domain 102 are copied onto the bus 316. The network device 300, 301 or 303 recognizing the packet as destined for any of its coupled ports retrieves the packet from the bus 316 and transmits the packet via the appropriate port.

A management system 330 is preferably coupled to the bus 316 if management capabilities are desired. The management system 330 includes a management module 330 coupled to the bus 316 and a memory device 334 coupled to the management module 332 and the network devices 302, 305 via the respective ports 320, 321. The memory device 334 is a programmable memory device, such as a static random access memory (SRAM), a dynamic RAM (DRAM) or any other suitable programmable memory device. Among other tasks, the management module 332 tracks an stores statistical information related to each of the ports 124, 126 and other information associated with each of the domains 102, 112. The management module 332 may further perform control functions such as security, turning on/off one or more ports, etc.

It is appreciated that an adaptive networking device according to the present invention enables a mix of data devices operating at different communication rates without requiring the hardware to be modified and upgraded. The present invention may be constructed using readily available "off the shelf" components with no need for further modification. Consequently, the cost of engineering, components and materials is minimized. Additionally, lower cost switching devices can be used for slower speed first domain communications. The need for the more expensive higher speed switch is minimized and need only be included if desired. Lower cost repeater devices, as opposed to high speed switch devices, can be used for the devices of a higher speed second domain. Further, extraneous, unnecessary communication between the domains is avoided by a bridge device. Thus, the present invention thus provides a lower cost implementation with relatively high performance.

Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. An adaptive networking device, comprising:
   a plurality of network ports, each operable at any one of a plurality of media standards;
   a bus;
   a first device coupled to the bus and that communicatively couples to any of the plurality of network ports that operate at a first media standard to transfer data between the bus and network ports communicatively coupled to the first device;
   a second device operable at a second media standard and including a link port, wherein the second device communicatively couples to any of the plurality of network ports that operate at the second media standard to transfer data between the link port and network ports communicatively coupled to the second device; and
   a bridge that transfers data between the link port and the bus to enable communication between the first and second devices.

2. The adaptive networking device of claim 1, further comprising:
   each of the plurality of network ports including media circuitry that detects a node coupled to a corresponding network port and that determines which of the plurality of media standards that the node operates.

3. The adaptive networking device of claim 2, wherein the media circuitry of each network port communicatively couples the corresponding network port to one of the first and second devices based on the determined media standard.

4. The adaptive networking device of claim 1, wherein the first media standard operates at a transmission rate of approximately 10 megabits per second (Mbps) and wherein the second media standard operates at a transmission rate of approximately 100 Mbps.

5. The adaptive networking device of claim 1, wherein the bus is a parallel bus with a plurality of data and address lines.

6. The adaptive networking device of claim 1, wherein the bus operates at a data transmission rate of approximately one gigabit per second.

7. The adaptive networking device of claim 1, wherein the bus is a Peripheral Component Interconnect bus.

8. The adaptive networking device of claim 1, wherein the first device comprises a network switch.

9. The adaptive networking device of claim 1, wherein the second device comprises a network repeater.

10. The adaptive networking device of claim 1, wherein the bridge operates as a switch for filtering communication between the link port and the bus.

11. The adaptive networking device of claim 1, wherein the bridge includes a second link port that operates as an uplink port.

12. The adaptive networking device of claim 1, further comprising:
a management device coupled to the bus and to the second device.

13. The adaptive networking device of claim 12, further comprising:
a memory device coupled to the management device.

14. An adaptive networking device, comprising:
a plurality of network ports, each operable at any one of a plurality of media standards;
a bus;
a plurality of switch modules that operate according to a first media standard, wherein each of the plurality of switch modules is coupled to the bus and to a respective subset of the plurality of network ports, and wherein each switch module operates to transfer data between the bus and those of the respective subset of network ports that operate according to the first media standard;
a first repeater module coupled to a first set of the plurality of network ports and operable according to a second media standard and including a link port, wherein the first repeater module operates to transfer data between the link port and any of the first set of the plurality of network ports that operate according to the second media standard;
a second repeater module operable according to a second media standard and including a first link port coupled to the link port of the first repeater module and including a second link port, wherein the second repeater module is coupled to a second set of the plurality of network ports and operates to transfer data between the first and second link ports of the second repeater module and any of the second set of the plurality of network ports that operate according to the second media standard; and
a bridge that transfers data between the second link port of the second repeater module and the bus to enable communication between the plurality of switch modules and the first and second repeater modules.

15. The adaptive networking device of claim 14, further comprising:
each of the plurality of network ports including media circuitry that detects communication at a corresponding network port and that establishes a communication link between the corresponding network port and the first repeater module or the second repeater module or a corresponding one of the plurality of switch modules.

16. The adaptive networking device of claim 14, wherein the bus is a Peripheral Component Interconnect bus.

17. The adaptive networking device of claim 14, wherein the bridge operates as a switch for filtering data between the second link port of the second repeater module and the bus.

18. The adaptive networking device of claim 14, further comprising:
a management system coupled to the bus and to the first and second repeater modules.

19. A network system, comprising:
a plurality of network nodes, each operable according to any one of a plurality of media standards; and
an adaptive network device for enabling communication between the plurality of network nodes, comprising:
a plurality of network ports, each operable according to any one of the plurality of media standards and configured to establish a communication link to any of the plurality of network nodes;
a bus;
a first communication system coupled to the bus and to the plurality of network ports, wherein the first communication system operates according to a first media standard to transfer data between the bus and any of the plurality of network nodes that operate according to the first media standard;
a second communication system coupled to the plurality of network ports and including a link port, wherein the second communication system is operable according to a second media standard to transfer data between the link port and any of the plurality of network ports that operate according to the second media standard; and
a bridge coupled between the link port of the second communication system and the bus that enables communication between network nodes coupled to the first communication system and network nodes coupled to the second communication system via the link port and the bus.

20. The network system of claim 19, further comprising:
each of the plurality of network ports including media circuitry that detects coupling of a network node, that determines whether the coupled network node operates according to the first or the second media standard and that establishes a communication link between the coupled network node and one of the first and second communication systems.

21. The network system of claim 19, further comprising:
the first communication system operating in switch mode;
the second communication system operating in shared mode; and
the bridge operating to filter communication between network nodes coupled to the first and second communication systems.

* * * * *